United States Patent Office.

GEORGE W. GISH AND WILLIAM H. FERGUSON, OF DAVIESS COUNTY, KENTUCKY.

Letters Patent No. 72,996, dated January 7, 1868; antedated December 12, 1867.

IMPROVED MEDICINE FOR THE CURE OF HOG-CHOLERA.

The Schedule referred to in these Letters Patent and making part of the same.

TO ALL WHOM IT MAY CONCERN:

Be it known that we, G. W. GISH and W. H. FERGUSON, of Daviess county, in the State of Kentucky, have invented or discovered a Cure for Hog-Cholera; and we hereby declare that the following are the ingredients thereof:

Bluestone, or blue vitriol, or sulphate of copper, and the extract of logwood.

A mixture of these articles, in the proportion of one part of bluestone to two parts of extract of logwood, constitutes the cure.

We claim the medicine made by mixing, or by using at the same time, the ingredients described, for the purposes set forth.

G. W. GISH,
                                  W. H. FERGUSON.

Witnesses:
 JAMES GLENN,
 L. R. GLENN.